United States Patent [19]

Andrassy

[11] Patent Number: 5,001,846
[45] Date of Patent: Mar. 26, 1991

[54] SOLAR ELECTRIC DRYING APPARATUS

[76] Inventor: Stella Andrassy, P.O. Box 385, Kingston, N.J. 08528

[21] Appl. No.: 540,559

[22] Filed: Jun. 7, 1990

[51] Int. Cl.⁵ ............................................. F26B 19/00
[52] U.S. Cl. ........................................ 34/93; 34/219; 126/417; 202/234
[58] Field of Search ..................... 34/93, 90, 218, 219, 34/80, 201; 126/417, 450, 451; 202/234; 203/DIG. 1; 136/243, 244

[56] References Cited

U.S. PATENT DOCUMENTS

| | | | |
|---|---|---|---|
| 1,073,729 | 9/1913 | Barnard | 34/93 |
| 1,362,216 | 12/1920 | Barnard et al. | 34/93 |
| 2,084,419 | 6/1937 | Wallis | 203/33 |
| 2,383,234 | 8/1945 | Barnes | 202/234 |
| 2,402,737 | 6/1946 | Delano | 202/234 |
| 2,827,368 | 3/1958 | Mortenson et al. | 71/12 |
| 3,050,383 | 8/1962 | Wilson | 71/12 |
| 3,290,230 | 12/1966 | Kobayashi | 202/234 |
| 3,330,740 | 7/1967 | Duffy | 202/234 |
| 3,501,381 | 3/1970 | Delano | 202/234 |
| 3,642,583 | 2/1972 | Greenberg et al. | 203/100 |
| 3,846,251 | 11/1974 | Hay | 203/234 |
| 3,932,166 | 12/1975 | Slikkers, Jr. | 203/37 |
| 4,038,181 | 7/1977 | Talbert | 71/12 |
| 4,045,880 | 9/1977 | Steffen | 34/93 |
| 4,056,380 | 11/1977 | Thiac | 71/12 |
| 4,191,549 | 3/1980 | Boyko | 71/13 |
| 4,230,531 | 10/1980 | Fernandopulle | 202/234 |
| 4,235,678 | 11/1980 | McKeen | 202/234 |
| 4,271,326 | 6/1981 | Mego | 203/33 |
| 4,383,891 | 5/1983 | Clavier | 202/234 |
| 4,494,975 | 1/1985 | DeBoodt et al. | 71/25 |
| 4,519,831 | 5/1985 | Moore | 71/13 |
| 4,565,563 | 1/1986 | Talbert | 71/12 |
| 4,588,431 | 5/1986 | Nakamura et al. | 71/24 |
| 4,743,287 | 5/1988 | Robinson | 71/12 |
| 4,804,402 | 2/1989 | Joubert | 71/12 |

FOREIGN PATENT DOCUMENTS

| | | | |
|---|---|---|---|
| 9580 | 4/1978 | Japan | 203/DIG. 1 |
| 44364 | 4/1978 | Japan | 71/17 |
| 113691 | 9/1980 | Japan | 71/12 |
| 140691 | 6/1987 | Japan | 203/DIG. 1 |
| 1248961 | 8/1986 | U.S.S.R. | 203/DIG. 1 |

Primary Examiner—James C. Yeung
Attorney, Agent, or Firm—Sperry, Zoda & Kane

[57] ABSTRACT

A solar electric drying apparatus for drying and dehydration of articles positioned therein and collecting of clean distillate produced during the drying operation which includes a housing with side walls defining closable openings therein and defining an open top and bottom area. A top is translucent to permit light therethrough for warming of the distillation chamber defined therebelow. A distillation collection means including an accumulation container is positioned within the distillation chamber itself. A porous tray extends across the open bottom area of the housing upon which articles to be solar dried are placed. A support table is adapted to receive the housing structure mounted thereon detachably and includes a blower means capable of including a heating means for blowing of air vertically through the porous tray to facilitate drying and dehydration and to equalize temperature and humidity characteristics within the distillation chamber. The blower device is powered by a drive menas which draws its energy from a solar powered battery means.

20 Claims, 2 Drawing Sheets

SOLAR ELECTRIC DRYING APPARATUS

BACKGROUND OF THE INVENTION

1. Field Of The Invention

The present invention deals with the field of devices for utilizing solar energy to facilitate dehydration and drying of articles which in combination with collection of the clean distillate produced thereby provides an energy efficient means for drying which does not utilize any fossil fuel or other energy source and provides the two-fold function of drying of articles as desired and production of clean water through distillation. The apparatus of the present invention includes a solar power means for driving of a blower to facilitate efficient operation of the dehydration and distillation collection aspects.

The device of the present invention has almost limitless industrial potential throughout the world. This device facilitates the feeding of large cities throughout the world and aids in the distribution of fresh produce to these markets. Dried food which has extremely long shelf life is truly the food of the future. The technology generated by this invention will generate many new markets specifically in those areas where transportation and refrigeration costs have been found heretofore to be prohibitive.

In regions where open-air drying is already part of the industry, the present closed continuous process provides a system which prevents contamination depredation and spoilage due to interrupted drying. The concept in accordance with the present invention also saves extensive time, labor and money and prevents accidental or climate induced rehydration. In those environments such as hot and humid climates where open-air drying is risky and uncertain the present invention provides a means for controlling such dehydration. The present invention provides a means for industry to experience extreme fuel cost savings and reduced pollution and environmental damage. The truck farming industry will be extremely encouraged by the wide dissemination of dried foods.

2. Description Of The Prior Art

Prior art devices have been designed for making use of solar energy in a similar manner as shown in U.S. Pat. No. 3,351,538 issued Nov. 7, 1967 to S. Andrassy on Solar Distillation Equipment; U.S. Pat. No. 2,084,419 patented June 22, 1937 to T. Wallis et al on Dehydrating Organic Liquids; U.S. Pat. No. 2,383,234 patented Aug. 21, 1945 to W. Barnes on a Solar Water Still; U.S. Pat. No. 2,402,737 patented June 25, 1946 to W. Delano on a Process and Apparatus for Distilling Liquids; U.S. Pat. No. 2,827,368 patented Mar. 18, 1958 to E. Mortenson et al on a Non-Burning Plant Fertilizer; U.S. Pat. No. 3,050,383 patented Aug. 21, 1962 to J. Wilson on Fertilizer; U.S. Pat. No. 3,290,230 patented Dec. 6, 1966 to G. Kobayashi on a Solar Still Apparatus For Extracting And Collecting Water From Soil; U.S. Pat. No. 3,330,740 patented Jul. 11, 1967 to L. Duffy on an Apparatus For Solar Distillation Of Liquids; U.S. Pat. No. 3,501,381 patented Mar. 17, 1970 to W. Delano on a Solar Still With Floating Slab-Supporting Particulate Radiant Energy Receptor; U.S. Pat. No. 3,642,583 patented Feb. 15, 1972 to J. Greenberg et al on Treatment Of Sewage And Other Contaminated Liquids With Recovery Of Water By Distillation And Oxidation; U.S. Pat. No. 3,846,251 patented Nov. 5, 1974 to H. Hay on an Apparatus For Solar Distillation; U.S. Pat. No. 3,929,586 patented Dec. 30, 1975 to G. Slikkers, Jr. on a Process For Treatment Of Organic Solvent-Containing Waste Sludges; U.S. Pat. No. 3,932,166 patented Jan. 13, 1976 to M. Vignovich et al on a Landfill and Soil Conditioner; U.S. Pat. No. 4,038,181 patented Jul. 26, 1977 to N. Talbert on a Process For Dewatering Sewage Sludge; U.S. Pat. No. 4,056,380 patented Nov. 1, 1977 to E. Thiac on a Method Of Producing An Organic Soil Additive And The Product Thereof; U.S. Pat. No. 4,191,549 patented Mar. 4, 1980 to M. Boyko on a Solar Chemical Process For Sludge Treatment; U.S. Pat. No. 4,230,531 patented Oct. 28, 1980 to P. Fernandopulle on a Wind Powered Solar Still; U.S. Pat. No. 4,235,678 patented Nov. 25, 1980 to J. McKeen on a Solar Powered Water Desalination System With A Regenerative Fixture; U.S. Pat. No. 4,271,326 patented June 2, 1981 to R. Mego on a Method Of Processing Organic Waste Into Useful Products; U.S. Pat. No. 4,383,891 patented May 17, 1983 to P. Clavier on a Device For Desalting Brackish Water, And A Conditioning Method And Device Relating To Said Desalting Device; U.S. Pat. No. 4,494,975 patented Jan. 22, 1985 to M. DeBoodt et al on Composing Compositions; U.S. Pat. No. 4,519,831 patented May 28, 1985 to W. Moore on a Method Of Converting Sewage Sludge To Fertilizer; U.S. Pat. No. 4,565,563 patented Jan. 21, 1986 to N. Talbert on a Method Of Producing Fertilizer Product Containing Sewage Sludge; U.S. Pat. No. 4,588,431 patented May 13, 1986 to T. Nakamura et al on a Mixed Phosphatic Fertilizer And Process For Producing The Same; U.S. Pat. No. 4,743,287 patented May 10, 1988 to E. Robinson on Fertilizer And Method; and U.S. Pat. No. 4,804,402 patented Feb. 14, 1989 to A. Joubert on Preparation Of Natural Fertilizing Material.

SUMMARY OF THE INVENTION

The present invention provides a solar electric drying apparatus for dehydration and drying of articles positioned within a distillation area and the collecting of clean distillate produced during the drying. The apparatus includes a housing defining a distillation chamber to facilitate solar drying, dehydration and concentration cooking of articles located therein. The housing more particularly includes four side walls extending approximately vertically to define the distillation chamber therebetween. The side walls define an open bottom area and an open top area therein to facilitate solar dehydration and distillate collection. The side walls define one or more side wall openings. The side walls further include side wall doors adapted to extend over the side wall openings as desired for selectively opening and/or closing of the side wall openings as desired. In this manner venting of the distillation chamber is available. The housing further includes L-shaped support members thereon adapted to facilitate mounting of the housing with respect to the table therebelow. A top is defined extending over at least a portion of the top open area of the distillation chamber of the housing. The top area is preferably translucent to allow solar heating of the distillation chamber and of articles positioned therein to facilitate dehydration thereof.

A distillation collection device includes an inclined surface member preferably formed as the top member of the housing. The inclined surface is adapted to receive condensed distillate thereon and is preferably V-shaped when viewed in cross-section to facilitate the flow of distillate therealong. The inclined surface includes a lower edge thereof adapted to receive the collected distillate as it flows along the collection surface of the top surface. The inclined surface member includes a water wettable plastic surface to facilitate the accumulation of distillate therein. The inclined surface includes a sanded surface to further facilitate water wettability thereof and prevent beading of the condensed distillate to aid in flow therealong. A distillate accumulation container is positioned within the housing adjacent the lower end of the inclined surface member and is adapted to receive and retain collected distillate therein.

A porous tray means extends over the open bottom area of the housing to facilitate placement of articles to be solar dried. The porous tray is detachably positionable extending over the open bottom area of the housing in such a manner as to facilitate the removal and replacement of articles to be dried as desired. The porous tray may include individual sharpened peg means thereon to aid retainment of individual fruit members such as grapes to aid in dehydration thereof. The porous tray may also include individual tray members movable with respect to one another to facilitate rotation of individual articles to be dehydrated.

A support table is preferably included which is adapted to receive the housing of the solar drying apparatus mounted thereon. The support table preferably includes an upper table surface and a housing support device to facilitate detachable retainment of the housing in a spatially disposed position above the upper table surface of the support table in such a manner as to define an upper table chamber therebetween. A blower is also preferably included positioned within the upper table chamber to facilitate circulation of air from the upper table chamber upwardly through the porous tray into the distillation chamber to allow circulation of air therein and to facilitate dehydration of articles positioned upon the porous tray and the collection of distillate within the distillation chamber. The blower preferably includes a heating means therein which is selectively operable to introduce additional heat as desired within the distillation chamber and the upper table chamber.

A drive means is preferably included which is operatively connected with respect to the blower means to facilitate driving thereof. A solar powered energy storage and supply means is operatively secured with respect to the drive means for selective powering thereof. Also a thermostat means may be included which is operative to sense temperature within the distillation chamber and is responsive to the temperature therein being below a predetermined value to initiate activation of the heating means and the blower means to thereby control temperature therein.

It is an object of the present invention to provide a solar electric drying apparatus for dehydration of articles positioned therein and collecting of clean distillate produced during drying wherein no external additional energy such as fossil fuel is needed for operation.

It is an object of the present invention to provide a solar electric drying apparatus for drying of articles positioned therein and collecting of clean distillate produced during dehydration wherein initial cost and capital outlay is minimized.

It is an object of the present invention to provide a solar electric drying apparatus for drying of articles positioned therein and collecting of clean distillate produced during dehydration wherein maintenance costs are minimized.

It is an object of the present invention to provide a solar electric drying apparatus for dehydration of articles positioned therein and collecting of clean distillate produced wherein down time is minimized.

It is an object of the present invention to provide a solar electric drying apparatus for dehydration of articles positioned therein and collecting of clean distillate produced wherein the number of moving parts is minimized.

It is an object of the present invention to provide a solar electric drying apparatus for drying of articles positioned therein and collecting of clean distillate produced during dehydration wherein full usage is made of solar energy sources.

It is an object of the present invention to provide a solar electric drying apparatus for drying of articles positioned therein and collecting of clean distillate produced during dehydration wherein collection of clean distillate is facilitated by collecting thereof within the distillation chamber itself.

It is an object of the present invention to provide a solar electric drying apparatus for drying of articles positioned therein and collecting of clean distillate produced wherein a solar powered blower means is included in order to equalize humidity and temperature conditions within the distillation chamber.

It is an object of the present invention to provide a solar electric drying apparatus for drying of articles positioned therein and collecting of clean distillate produced wherein a great variety of different types of articles can be dehydrated within the chamber including individual food articles, clothing articles, flowers, undesirably wetted articles and other wet articles.

It is an object of the present invention to provide a solar electric drying apparatus for drying of articles positioned therein and collecting of clean distillate produced wherein more even drying is provided throughout all areas of the distillation chamber.

It is an object of the present invention to provide a solar electric drying apparatus for drying of articles positioned therein and collecting of clean distillate produced wherein a low volume widespread and low speed blower achieves equalization of conditions in all areas throughout the distillation chamber.

It is an object of the present invention to provide a solar electric drying apparatus for drying of articles positioned therein and collecting of clean distillate produced wherein the formation of crusting on the external surfaces of the articles being dehydrated is minimized.

It is an object of the present invention to provide a solar electric drying apparatus for drying of articles positioned therein and collecting of clean distillate produced wherein equalization of drying characteristics at all locations throughout the porous tray is achieved.

It is an object of the present invention to provide a solar electric drying apparatus for drying of articles positioned therein and collecting of clean distillate produced wherein condensing of distillate against the cooler upper surface is facilitated by the usage of a blower means circulating moist air thereagainst.

It is an object of the present invention to provide a solar electric drying apparatus for drying of articles positioned therein and collecting of clean distillate produced during dehydration wherein an auxiliary heating means is included to maintain operation of the apparatus of the present invention during periodic overcast conditions.

It is an object of the present invention to provide a solar electric drying apparatus for drying of articles positioned therein and collecting of clean distillate produced during drying wherein openable side doors are included to facilitate circulation of air with the external environment as desired to facilitate dehydration at the expense of some element of distillate collection.

It is an object of the present invention to provide a solar electric drying apparatus for drying of articles positioned therein and collecting of clean distillate produced wherein the temperature within the distillation chamber is maintained between 150 degrees and 200 degrees Fahrenheit.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
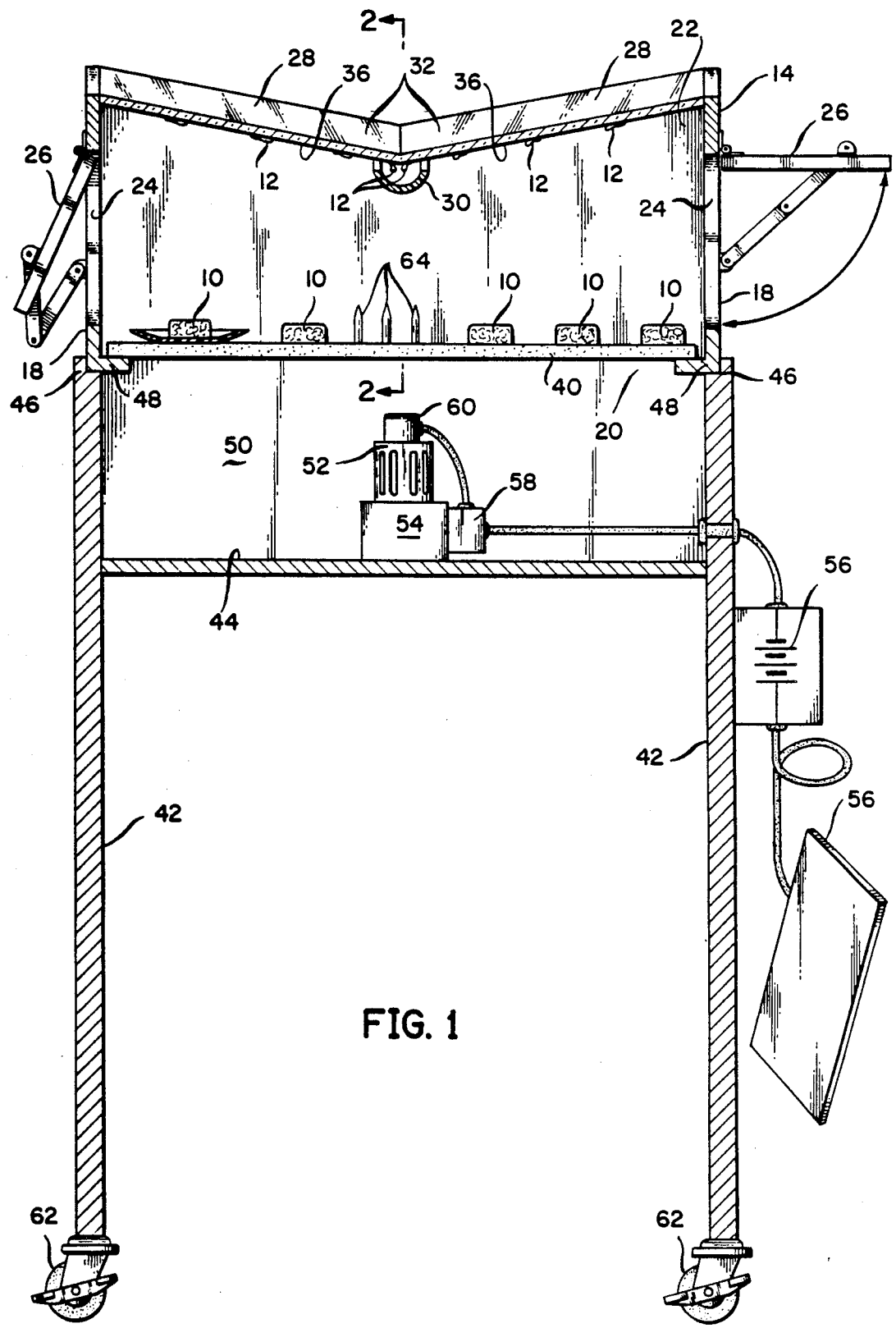
FIG. 1 is a cross-sectional illustration of an embodiment of the solar electric drying apparatus of the present invention.
Figure 2:
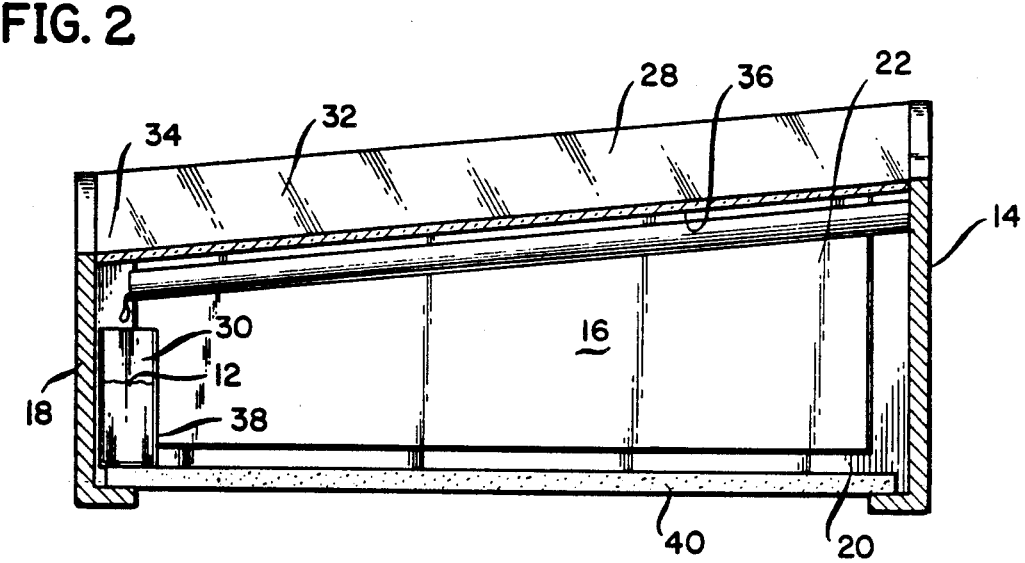
FIG. 2 is a longitudinal cross-section of the configuration shown in FIG. 1 along lines 2—2.
Figure 3:
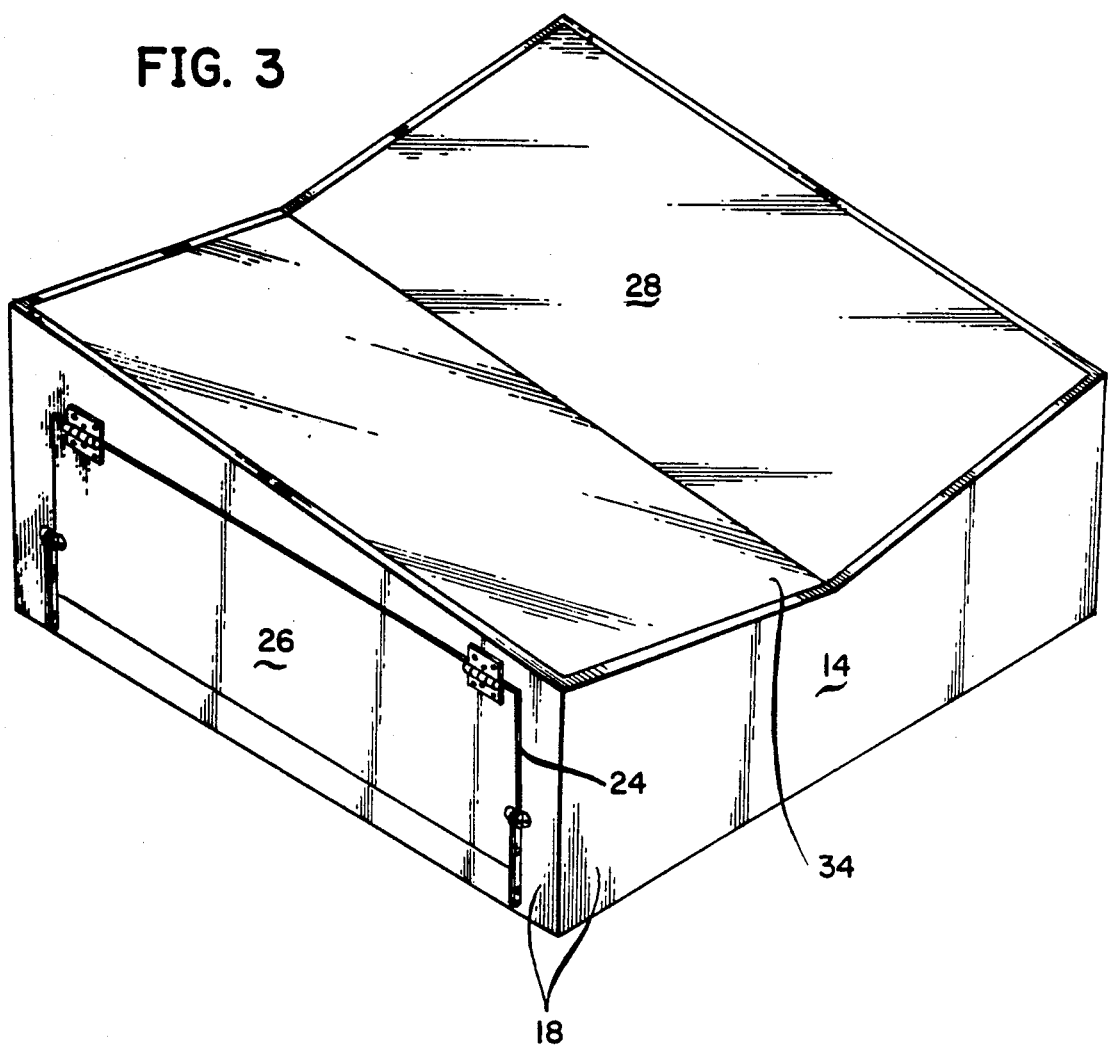
FIG. 3 is a perspective illustration of the external configuration of the housing means and top member of the present invention as shown in FIG. 1.

The present invention provides a solar electric drying apparatus for dehydration and concentration drying of articles 10 positioned within a distillation chamber 16. A housing 14 is defined including a plurality of side walls 18. Preferably four such side walls 18 included in the housing 14 define therebetween the distillation chamber 16.

Housing means 14 preferably includes an open bottom area 20 and an open top area 22. A top means 28 preferably extends over the open top area 22. A porous tray means 40 preferably extends across the open bottom area 20 thereof.

The side wall means 18 of housing 14 preferably defines a plurality of side wall openings 24 in one or more sides thereof. Each side wall opening 24 includes a side wall door 26 associated therewith adapted to selectively to extend across the side wall opening for closing thereof. Each side wall door 26 also may be moved to an opened position to allow circulation of air between the distillation chamber 16 defined within the housing 14 and the external environment through the side wall openings 24.

A distillation collection means 30 is included in the present invention which is adapted to collect distillate 12 which condenses upon the top means 28 during solar heating of distillation chamber 16. To facilitate this distillation collection an inclined surface member 32 which is preferably V-shaped in cross-section may be included. Preferably the inclined surface member 32 comprises the top means 28. The inclining of surface member 32 provides a lower end 38 to which the distillate 12 which condenses thereon tends to flow toward. Flow along the undersurface of inclined surface member 32 is facilitated by the formation of this surface as a water wettable surface 36.

As the distillate 12 flows downwardly along the inclined surface member 32 over the water wettable surface 36 it gathers adjacent the lower end 34 thereof. A distillation accumulation means 38 in the form of a container is therepositioned adapted to receive the condensed distillate 12 therein.

The positioning of the distillate accumulation means 38 within the distillation chamber 16 provides a means for collecting the clean distillate and maintaining that collected distillate 12 free of external contaminants due to the isolation thereof from the external environment by being placed within the distillation chamber 16. In this manner leaves or insects or other contaminants are prevented from entering the distillation accumulation means 38.

The present invention further includes a support table 42 which includes an upper table surface 44 adapted to receive the housing means 14 mounted thereon. To facilitate this mounting the support table 42 includes a housing support means 46 adapted to mate with L-shaped support members 48 of housing 14 in such a manner as to define therebetween an upper table chamber 50. The upper table chamber 50 is positioned immediately below the bottom surface of the porous tray means 40 and between the side walls of the housing support 46 and above the upper table surface 44. In order to facilitate movement of support table 42 into proper alignment with respect to solar conditions a wheel means 62 may be included at the lower ends of the legs of support table 42. Preferably the wheel means allow rotation of the support table and include locking means to facilitate retainment of the support table in the final chosen position.

To facilitate cooking the porous tray means 40 may take the form of a plurality of individual trays 66 which are capable of movement relative with respect to one another to aid in rotating during cooking or drying and to aid in movability of individual items being cooked or dried with respect to one another during the drying process. The preferred form of the tray 40 is a black metal perforated tray. The usage of a plurality of individual shallow containers 66 facilitates formation of items such as fruit butters, fruit leathers and vegetable purees. In order to aid in the cooking or drying of carrots or apple slices the individual trays 66 have been found to be extremely useful. Also tray 40 may include a plurality of individual peg members to aid in drying of small fruits such as grapes and blueberries. The individual small peg members should be sharpened on the upper tips thereof to facilitate retaining of the individual small fruits with respect to the individual pegs.

Preferably a blower means 52 may be positioned within the upper table chamber 50 being powered by a drive means 54. Drive means 54 is preferably driven by a solar powered energy storage and supply means 56 which may take the form of solar collection panels and an energy storage device such as battery which is charged by solar radiation on the solar collection panels.

A thermostat means 58 may be positioned within the upper table chamber 50 and a heating means 60 may be positioned within the blower means 52 to facilitate heating of the air blown thereby. The thermostat means is adapted to sense temperature conditions within the upper table chamber 50 and the distillation chamber 16 in order to initiate operation of the heating means 60 and/or the blower means 52 responsive to predetermined threshold conditions. For example when the temperature is deemed to be below the desired operating range within the distillation chamber 16 of 150 degrees to 200 degrees Fahrenheit then the heating means 60 will be rendered operative to heat the air blown outwardly by the blower means 52 in such a manner as to increase the temperature therein into this operating temperature range.

The articles to be dried or cooked within the distillation chamber 16 of the present invention may take a variety of forms. One of the most preferred forms would be basic food items wherein concentration cooking or dehydration can be achieved within the distillation chamber. The moisture generated by this cooking would provide distillate 12 which will condense upon the inclined distillation surface 32 for collection within distillation accumulation means 38. In addition to food items other items can be heated for dehydration purposes and/or concentration cooking purposes such as the formation of dried flowers from normal flowers, drying of clothing and any other article which is desired to be either cooked or dried.

Preferably the inclined surface 2 is V-shaped in cross-section as shown best in FIG. 1 such that the distillate is collected on the lower surface thereof. The distillate will tend to collect on this surface in view of the fact that the surface is somewhat cool with respect to the temperature within the distillation chamber 16. If the temperature within the distillation chamber 16 is between 150 degrees and 200 degrees Fahrenheit surely the external environment will cool the top means 28 and the inclined surface member 32 in such a manner that moisture removed from the articles 10 during concentration cooking or dehydration thereof will tend to condense on the inclined surface member 32. This condensed distillate 12 will then be able to flow along the surface in the inclined direction toward the lower end 34 thereof. This flow is enhanced by the formation of the undersurface of the inclined surface member 32 to be water wettable. The water wettable characteristics of this surface are enhanced preferably by an operation of sanding performed to this undersurface in order to decrease the smoothness of the surface. This slight frosting or sanding of the surface will prevent beading of the distillate 12 collected thereon and therefore will improve flow characteristics along the direction induced by gravitational flow along the inclined surface 32. A flow channel 30 may be included for collecting distillate produced at the bottom point of the V-shaped cross-section top means 28.

The blower means 52 will enhance the dehydration or concentration cooking of the articles 10 by constantly blowing the moist air generated during this drying against the inclined surface member 32. This will increase the condensation thereon and enhance the collection of distillate within the distillation collection means 30. The blower can be a low speed, wide range, low power blower only for the purposes of gently circulating the air within the distillation chamber 16 and the upper table chamber 50 by blowing of air from the upper table chamber 50 through the porous tray means 40 into the distillation chamber 16. In this manner a constant new supply of air is generated in the area immediately adjacent to the articles 10 and a constant new supply of air is blown against the inclined surface member 32. The blower means 52 is preferably powered by the solar generated energy source and control of operation thereof and specifically of operation of the heating means 60 can be facilitated by electrical connection with respect to the thermostat means 58. In this manner maintenance of the operating conditions within the distillation chamber 16 of 150 degrees to 200 degrees Fahrenheit can be achieved without requiring the expending of any fossil or other non-renewable energy.

Under conditions wherein concentration cooking or dehydration of articles 10 is of increased importance and wherein collection of distillate 12 is rendered relatively unimportant the opening of the side doors 26 to facilitate circulation of air through the distillation chamber is made possible. The doors 26 can be configured in one or more sides and will facilitate the access of external winds to the internal distillation chamber for facilitating drying.

In this manner the opening of one or more such doors 26 can be performed as desired and as determined by the external and internal conditions and as to whether drying or collection of distillate is deemed to be more important. This provides an overall variability and universal application for the apparatus of the present invention not addressed heretofore.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A solar electric drying apparatus for drying of articles positioned therein and collecting of clean distillate produced during drying, said solar electric drying apparatus comprising:
  (a) a housing means defining a distillation chamber therein to facilitate solar dehydration of articles positioned therein, said housing means further including:
    (1) a plurality of side wall means extending approximately vertically to define said distillation chamber therebetween, said side wall means defining an open bottom area and an open top area therein to facilitate solar dehydration and distillate collection;
    (2) a top means extending over at least a portion of said top opening area of said distillation chamber, said top means being non-opaque to allow solar heating of said distillation chamber and of articles positioned therein for dehydration thereof;
  (b) a distillate collection means comprising:
    (1) an inclined surface member positioned within said distillation chamber and adapted to receive condensed distillate thereon, said inclined surface member including a lower end thereof adapted to receive collected distillate therealong;
    (2) a distillate accumulation means positioned within said housing means adjacent said lower end of said inclined surface member and adapted to receive and retain collected distillate therefrom;
  (c) a porous tray means extending across said open bottom area of said housing means to facilitate placement of articles to be solar dehydrated thereupon;

(d) a support table adapted to receive said housing means of said solar drying apparatus mounted thereon, said support table further including:
  (1) an upper table surface;
  (2) a housing support means to facilitate retainment of said housing means of said solar electric drying apparatus spatially disposed above said upper table surface of said support table to define an upper table chamber therein; and
(e) a blower means positioned within said upper table chamber to facilitate circulation of air from said upper table chamber upwardly through said porous tray means into said distillation chamber to allow circulation of air therein to facilitate drying of articles positioned upon said porous tray means and collection of distillate within said distillation chamber.

2. A solar electric drying apparatus for drying of articles positioned therein and collecting of clean distillate produced during drying as defined in claim 1 further comprising a drive means operatively connected with respect to said blower means for driving same.

3. A solar electric drying apparatus for drying of articles positioned therein and collecting of clean distillate produced during drying as defined in claim 2 further comprising a solar powered energy storage and supply means operatively secured with respect to said drive means for powering same.

4. A solar electric drying apparatus for drying of articles positioned therein and collecting of clean distillate produced during drying as defined in claim 1 wherein said top means comprises said inclined surface member to facilitate receiving of condensed distillate thereon.

5. A solar electric drying apparatus for drying of articles positioned therein and collecting of clean distillate produced during drying as defined in claim 1 wherein said top means is translucent to facilitate solar heating of said distillation chamber.

6. A solar electric drying apparatus for drying of articles positioned therein and collecting of clean distillate produced during drying as defined in claim 1 wherein said top means is transparent to facilitate solar heating of said distillation chamber.

7. A solar electric drying apparatus for drying of articles positioned therein and collecting of clean distillate produced during drying as defined in claim 1 wherein said inclined surface member includes a water wettable surface for receiving the condensed distillate.

8. A solar electric drying apparatus for drying of articles positioned therein and collecting of clean distillate produced during drying as defined in claim 7 wherein said water wettable surface is made of plastic.

9. A solar electric drying apparatus for drying of articles positioned therein and collecting of clean distillate produced during drying as defined in claim 1 wherein said inclined surface member is cross-sectionally V-shaped to facilitate accumulation of distillate thereon.

10. A solar electric drying apparatus for drying of articles positioned therein and collecting of clean distillate produced during drying as defined in claim 1 wherein said side wall means of said housing means define side wall opening means therein and side wall door means extendable across said side wall openings for selectively opening and closing thereof as desired.

11. A solar electric drying apparatus for drying of articles positioned therein and collecting of clean distillate produced during drying as defined in claim 1 wherein said housing means includes L-shaped support members adapted to abut said housing support means to facilitate retainment thereof with respect to said support table.

12. A solar electric drying apparatus for drying of articles positioned therein and collecting of clean distillate produced during drying as defined in claim 11 wherein said housing means is detachably engageable with respect to said support table.

13. A solar electric drying apparatus for drying of articles positioned therein and collecting of clean distillate produced during drying as defined in claim 1 wherein said side wall means comprises four side wall members.

14. A solar electric drying apparatus for drying of articles positioned therein and collecting of clean distillate produced during drying as defined in claim 1 wherein said porous tray means is selectively removable with respect to said open bottom area of said housing means to facilitate removal and replacement of articles thereon.

15. A solar electric drying apparatus for drying of articles positioned therein and collecting of clean distillate produced during drying as defined in claim 1 wherein said inclined surface member is made of plastic made water wettable by sanding of the surface thereof to minimize beading of condensed distillate thereon and facilitate flow of distillate therealong.

16. A solar electric drying apparatus for drying of articles positioned therein and collecting of clean distillate produced during drying as defined in claim 1 wherein said blower means includes heating means therein selectively operable to introduce additional heat as desired within said distillation chamber and said upper table chamber.

17. A solar electric drying apparatus for drying of articles positioned therein and collecting of clean distillate produced during drying as defined in claim 16 further including thermostat means adapted to sense temperature within said distillation chamber.

18. A solar electric drying apparatus for drying of articles positioned therein and collecting of clean distillate produced during drying as defined in claim 17 wherein said thermostat means is adapted to render said heating means and said blower means operative responsive to the temperature within said distillation chamber falling below a given predetermined value.

19. A solar electric drying apparatus for drying of articles positioned therein and collecting of clean distillate produced during drying as defined in claim 18 wherein said thermostat means is adapted to render said heating means and said blower means operative responsive to the temperature within said distillation chamber falling below a given predetermined value between 150 and 200 degrees Fahrenheit.

20. A solar electric drying apparatus for drying of articles positioned therein and collecting of clean distillate produced during drying, said solar electric drying apparatus comprising:
(a) a housing means defining a distillation chamber therein to facilitate solar dehydration of articles positioned therein, said housing means further including:
  (1) four side wall means extending approximately vertically to define said distillation chamber therebetween, said side wall means defining an open bottom area and an open top area therein to facilitate solar drying and distillate collection, said side wall means defining at least one side wall opening means therein, said side wall means further defining side wall door means extendable over said side wall opening means for selectively opening and closing thereof as desired, said housing means further including L-shaped support members adapted to facilitate mounting of said housing means;

(2) a top means extending over at least a portion of said top opening area of said distillation chamber, said top means being translucent to allow solar heating of said distillation chamber and of articles positioned therein for drying thereof;

(b) a distillate collection means comprising:
(1) an inclined surface member forming at least a portion of said top means being positioned within said distillation chamber and adapted to receive condensed distillate thereon, said inclined surface being V-shaped in cross-section to facilitate distillate flow therealong, said inclined surface member including a lower end thereof adapted to receive collected distillate therealong, said inclined surface member including a water wettable plastic surface to facilitate accumulation of distillate thereon, said inclined surface member including a sanded surface to facilitate water wettability thereof to prevent beading of condensed distillate thereon to facilitate flow therealong;
(2) a distillate accumulation means positioned within said housing means adjacent said lower end of said inclined surface member and adapted to receive and retain collected distillate therefrom;

(c) A porous tray means extending across said open bottom area of said housing means to facilitate placement of articles to be solar dehydrated thereupon, said porous tray means being detachably positionable extending over said open bottom area of said housing means to facilitate replacement of articles to be dried thereon;

(d) a support table adapted to receive said housing means of said solar drying apparatus mounted thereon, said support table further including:
(1) an upper table surface;
(2) a housing support means to facilitate detachable retainment of said housing means of said solar electric drying apparatus spatially disposed above said upper table surface of said support table to define an upper table chamber therein;

(e) a blower means positioned within said upper table chamber to facilitate circulation of air from said upper table chamber upwardly through said porous tray means into said distillation chamber to allow circulation of air therein to facilitate dehydration of articles positioned upon said porous tray means and collection of distillate within said distillation chamber, said blower means including heating means therein selectively operable to introduce additional heat as desired within said distillation chamber and said upper table chamber;

(f) a drive means operatively connected with respect to said blower means for driving thereof;

(g) a solar powered energy storage and supply means operatively secured with respect to said drive means for powering thereof; and (h) thermostat means operative to sense temperature within said distillation chamber and being responsive to the temperature therein being below a predetermined value to initiate activation of said heating means and said blower means.

* * * * *